United States Patent [19]

Sadjadi

[11] Patent Number: 4,783,828
[45] Date of Patent: Nov. 8, 1988

[54] TWO-DIMENSIONAL OBJECT RECOGNITION USING CHAIN CODES, HISTOGRAM NORMALIZATION AND TRELLIS ALGORITHM

[75] Inventor: Firooz A. Sadjadi, St. Anthony, Minn.

[73] Assignee: Honeywell Inc., Minneapolis, Minn.

[21] Appl. No.: 870,603

[22] Filed: Jun. 2, 1986

[51] Int. Cl.⁴ .............................. G06K 9/48
[52] U.S. Cl. ............................ 382/21; 382/18; 382/22; 382/42; 382/51
[58] Field of Search ............ 350/13, 136, 166; 382/13, 18, 20–22, 25, 28, 34, 42, 51, 56

[56] References Cited

U.S. PATENT DOCUMENTS

| | | | |
|---|---|---|---|
| 4,097,845 | 6/1978 | Bacus | 382/6 |
| 4,254,400 | 3/1981 | Yoda et al. | 382/18 |
| 4,541,115 | 9/1985 | Werth | 382/14 |
| 4,545,067 | 10/1985 | Juvin et al. | 382/56 |
| 4,550,431 | 10/1985 | Werth et al. | 382/1 |
| 4,567,610 | 1/1986 | McConnell | 382/18 |
| 4,593,367 | 6/1986 | Slack et al. | 382/15 |

OTHER PUBLICATIONS

"Recognition of Distorted Patterns Using the Viterbi Algorithm, IEEE Transactions on Pattern Analysis and Machine Intelligence," vol. PAMI-4, No. 1, Jan. 1982.

Primary Examiner—Leo H. Boudreau
Assistant Examiner—Jose L. Couso
Attorney, Agent, or Firm—George A. Leone, Sr.; John G. Shudy, Jr.

[57] ABSTRACT

A system for classifying a two-dimensional object, the object having a boundary. The system includes a sensor for sensing the boundary of the object, a processor which assigns a chain code to the boundary of the object and memory for storing a plurality of chain code histograms corresponding to known two-dimensional objects. A histogram is generated from the object's assigned chain code and correlated in the processor with a chain code histogram from memory. A final ambiguity between the normalized chain code of the object and the chain code of the correlating known object is resolved through application of a Viterbi algorithm.

10 Claims, 3 Drawing Sheets

TWO-DIMENSIONAL OBJECT RECOGNITION USING CHAIN CODES, HISTOGRAM NORMALIZATION AND TRELLIS ALGORITHM

BACKGROUND OF THE INVENTION

I. Field of the Invention:

This invention relates generally to two-dimensional object recognition and, more particularly, to a system for two-dimensional object recognition using chain codes, histogram normalization and trellis algorithms.

II. Discussion of the Prior Art:

Object recognition of two-dimensional objects is useful in a variety of applications including manufacturing and military applications. Two-dimensional object recognition can be used, for example, in connection with robotics on an assembly line, or in association with a military target recognition system. Desirable features of such a recognition system include the ability to recognize two-dimensional objects independent of rotation and size variations of two-dimensional objects with a minimum of complexity and a high degree of robustness. By minimizing the complexity of the system, fast, real-time, object recognition can be achieved. If such a system is also highly insensitive to noise, the system is said to be robust.

Known object recognition systems such as the "2D invariant moments" theory provide an algebraic approach to object recognition. Such systems yield variables or values which are numbers related to the shape of the object. One limitation of the 2D invariant moment approach is that changes in size or rotation will change the values obtained because such systems are very sensitive to noise. The 2D invariant moment system is complex and slow. It may become extremely slow and even more complex when scaling and rotational factors are present in the unknown object being classified or identified.

SUMMARY OF THE INVENTION

A new system for classifying a two-dimensional object is disclosed. In its broadest aspects, the system includes means for generating a histogram from the object's assigned chain code and means for correlating the generated histogram with a matching chain code histogram pattern of a known two-dimensional object. Finally, the system includes means for resolving the final ambiguity.

It is one object of the invention to provide a fast, real-time, robust two-dimensional object recognition system which transforms size variations of an unknown two-dimensional object into a vertical shift in the chain code histogram space, and rotational variations of the unknown object into horizontal shifts in the chain code histogram space.

This and other objects, features, and advantages of the invention will become apparent from the following detailed description and accompanying drawings.

BRIEF DESCRIPTION OF THE DRAWINGS

FIG. 3 is a series of detailed drawings wherein:

DESCRIPTION OF THE PREFERRED EMBODIMENT

Figure 1:
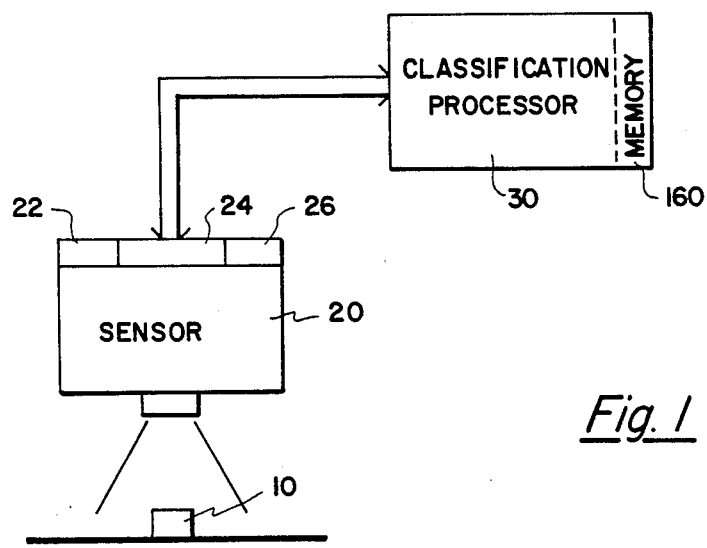
FIG. 1 is a block diagram of one embodiment of a two-dimensional object recognition system.

Referring now to FIG. 1, there is shown an unknown two-dimensional object 10 sensed by sensor 20. Sensor 20 includes means for detection 22 of the object 10, means for dimension sensing 24 and means for digitizing 26. Sensors which perform the functions of sensor 20 are commercially available. Sensor 20 may advantageously be an active sensor such as laser radar or high resolution radar, or sensor 20 may be a passive sensor operating in the infrared, ultraviolet or visible light frequencies. One example of an active sensor system is the HDS-23 programmable distance and dimension sensor as manufactured by Honeywell Inc. of Minneapolis, Minn. The HDS-23 system consists of an opto-electric sensor head with task specific preprogrammed microprocessor and connecting cables. The HDS-23 system further includes a microcomputer and an RS-422 or RS-232 communications link and can be interfaced to computers.

Figure 2:
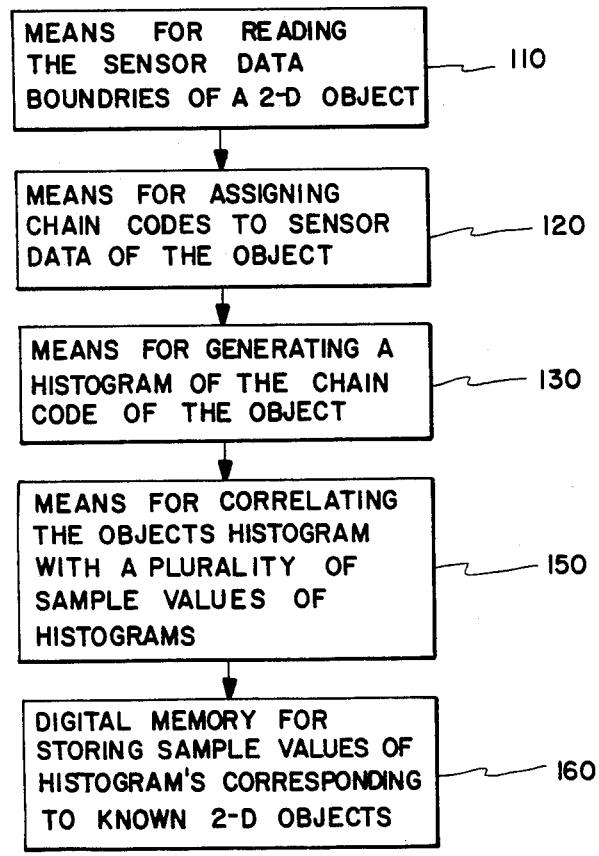
FIG. 2 is a flow chart of a preferred classification technique to classify unknown two-dimensional objects.

The output of sensor 20 is connected to a classification processor 30. The details of the classification processor 30 are shown in FIG. 2 and are explained in detail below. Classification processor 30 classifies the unknown object 10 through association and comparison with histogram and chain code data relating to known objects as explained below.

Referring now to FIG. 2, a flow chart of the elements included in the classification processor 30 is shown in detail. The digitized sensor data is applied to the means for reading the sensor data 110. The sensor data represents the boundary or boundaries of the unknown two-dimensional object in digital code. Means for assigning chain codes to the sensor data 120 accepts data from the reading means 110. Once the chain code is assigned to the sensor data, it is processed by means for generating a histogram from the assigned chain code 130 resulting in a chain code histogram reflecting the size and rotation of the object 10. Classification processor 30 includes a memory 160 for storing sample values of histogram patterns wherein such patterns correspond to known two-dimensional objects. The memory 160 may advantageously comprise a Read Only Memory or a Random Access Memory. The processor 30 may advantageously be a microprocessor or a dedicated VLSI circuit. Such sample values are correlated with the generated histogram by correlation means 150.

Figure 3A:
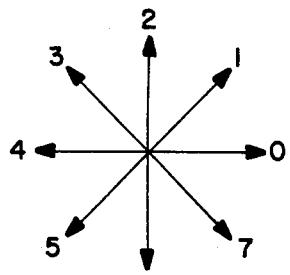
FIG. 3A is an example of a typical chain code rule.

Referring now to FIG. 3, a typical chain code rule as used by the invention is shown in FIG. 3A. By way of example, this rule is then applied to FIGS. 3B, 3C, and 3D as explained below. In applying a chain code such as the one shown in the example of FIG. 3A, one must adopt a convention such as advantageously establishing a reference point in the upper left hand corner of the object as shown in FIG. 3B and traveling clockwise around the object assigning chain codes to each boundary around the object depending upon the direction and angle one travels around the perimeter of the object. Further, the concept of scale can be introduced. For example, in one embodiment of the invention, chain codes are assigned to FIG. 3B by picking a reference point R in the upper left hand corner of the figure and proceeding in a clockwise direction around the figure so that the represented boundaries are assigned chain code 0642 according to the chain code rule illustrated in FIG. 3A. Similarly, FIG. 3D shows the same object rotated. Applying the same chain code rule with the same convention results in chain code 1753. FIG. 3C is similar to FIG. 3B but is of a larger scale. This scaling can be accounted for in the classification processor 30 by comparing the distance of the boundaries being coded with predetermined thresholds. For example, in a video scanning system, one pixel might be chosen to represent one unit of scale, two pixels two units, etc. It can be appreciated that the scaling convention used depends upon factors such as the size of the objects being classified, the sensing system, and the size of the known two-dimensional objects which comprise the universe of all classes of interest.

Figure 3B:
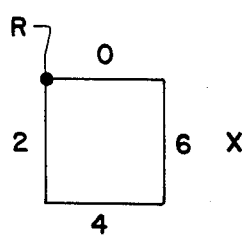
FIGS. 3B, 3C, and 3D are drawings of simple two-dimensional objects wherein the boundaries have been assigned chain codes according to the chain code rule illustrated in FIG. 3A.
Figure 3C:
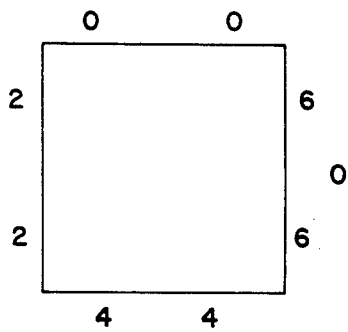
Figure 3D:
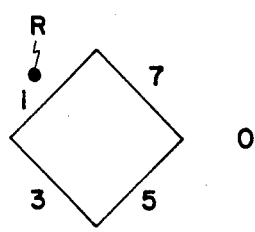
Figure 4A:
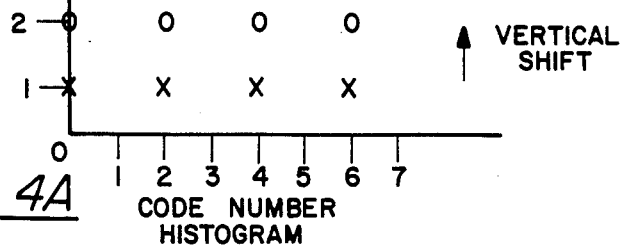
FIG. 4 includes FIGS. 4A and 4B which are graphs illustrating the vertical and horizontal shifts of chain code histograms as applied by one embodiment of the invention.
Figure 4B:
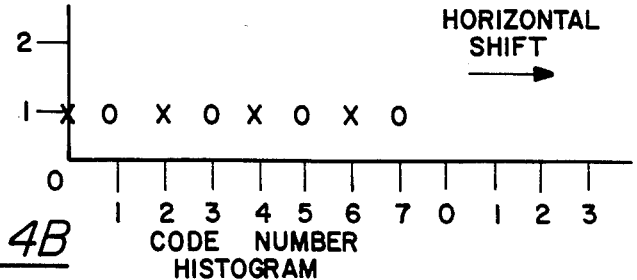

Referring now to FIG. 4, FIG. 4A shows a plot of the histogram of the object shown in FIG. 3C (shown as O's) together with a plot of the histogram of the chain code of the object shown in FIG. 3B (shown as X's). It can be immediately appreciated that the difference in scale between the object of FIG. 3B and FIG. 3C results in a vertical shift upwards in the histogram space of the larger object 3C. Similarly histograms shown in FIG. 3B show how the rotated FIG. 3D results in a horizontal shift of the chain code histogram as compared to the histogram for FIG. 4B. Thus FIG. 4B illustrates that rotational variations of two-dimensional objects are transformed to a circular horizontal shift in the chain code histogram space. FIG. 4A illustrates that size variations of the objects are transformed into vertical shift in the chain code histogram space. From viewing FIGS. 4A and 4B together, one skilled in the art can appreciate that a combination of size and rotation is transformed to simple vertical shift together with a circular horizontal shift in the chain code histogram space.

The system of the invention performs a histogram correlation using the above-described vertical and horizontal shifts to account for size and rotation variations of two-dimensional objects. The system correlates the histograms using a convention such as a simple Euclidian distance measure for the chain code histograms and a predetermined threshold. If the histogram of the unknown object 10 correlates well with the histogram of a known sample object which has its chain code histogram stored in memory, the chain code is then normalized and is sent to a Viterbi algorithm for removing a final ambiguity in classification between the unknown object and the correlating known two-dimensional object. This final ambiguity arises because two objects may correlate in histogram space, yet not be the same shape. This is explained further below with reference to FIG. 5.

Figure 5:
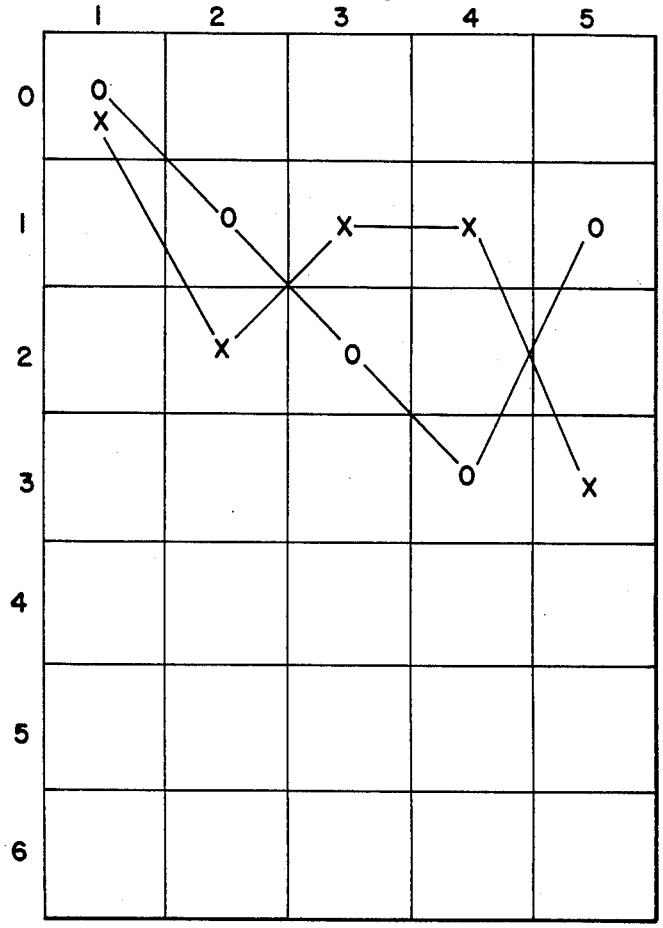
FIG. 5 is a chart illustrating the application of a trellis algorithm to remove the final ambiguity between a known and unknown two-dimensional object prior to classification of the unknown.

Referring now to FIG. 5, a chart showing one example of sample chain codes processed through such a Viterbi algorithm. Viterbi algorithms are well known in the art. One example of the application of such a trellis algorithm is explained in a paper entitled "Recognition of Distorted Patterns Using the Viterbi Algorithm", Hatsukazu Tanaka et al., IEEE Transactions on Pattern Analysis and Machine Intelligence, Vol. PAMI-4, No. 1, January 1982, which is incorporated herein by this reference. In FIG. 5 the vertical axis represents the chain code numbers and the horizontal axis represents the possible chain code states 1 through 5 in this example. The unknown object's chain code is represented by the "X" symbol and the known object's chain code is represented by the "O" figure. The two chain codes are processed through a Viterbi algorithm, applying a distance function to determine correlation. A threshold for the distance function may be defined in various ways depending upon the amount of noise that can be tolerated within the system. If there is a long chain code string with many states, the algorithm can be stopped any time the threshold is exceeded. Therefore, it can be appreciated that it may not be necessary to process all states of the chain codes being compared through the entire algorithm before deciding there is no match between the known and unknown objects.

In the example shown in FIG. 5, one example of a distance function may advantageously be selected to be the difference in chain code numbers for a given state. Using this convention it can be seen that at state "1" the difference is 0 since both "X" and "O" have chain code number 0. In state "2" the difference would be 1, similarly in state "3" the difference would be 1, etc., resulting in the table below:

TABLE I

| STATE | "X" CHAIN CODE | "O" CHAIN CODE | STATE DISTANCE | TOTAL DISTANCE |
|---|---|---|---|---|
| 1 | 0 | 0 | 0 | 0 |
| 2 | 2 | 1 | 1 | 1 |
| 3 | 1 | 2 | 1 | 2 |
| 4 | 1 | 3 | 2 | 4 |
| 5 | 3 | 1 | 2 | 6 |

In one example of the invention the distance may be compared with a predetermined threshold on a state-by-state basis. If the threshold is exceeded, the processor 30 decides there is no correlation and selects another sample histogram from memory at 510 of FIG. 6 as described below, thereby cycling through this process until a known shape is matched with the unknown object. It will be appreciated by those skilled in the art that there are many methods of representing a distance function and selecting an appropriate threshold. Factors to be considered include the size of the sample space of objects of interest, the complexity of the shapes being identified and the amount of noise present in the system due to the sensor being employed, etc.

Figure 6:
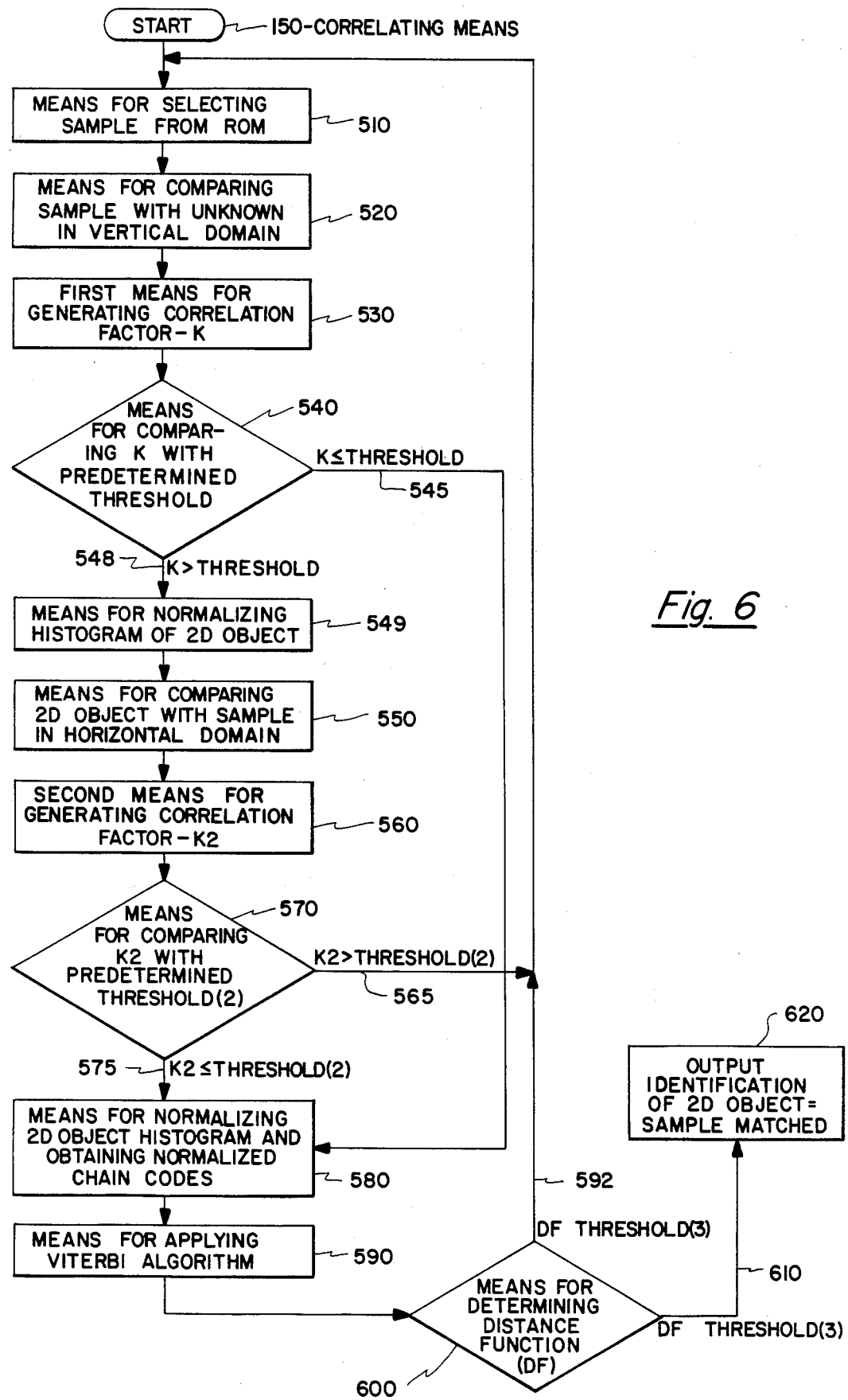
FIG. 6 is a flow chart of the correlation means used by one embodiment of the present invention for correlating the chain code histogram of an unknown two-dimensional object with the stored chain code histograms corresponding to known two-dimensional objects.

Referring now to FIG. 6, a flow chart of one example of the correlating means 150 is shown. A sample histogram pattern is selected for processing from ROM by a selecting means 510. The sample is then compared by comparison means 520 with the unknown object's chain code histogram in the vertical domain. A first generating means 530 then generates a correlation factor, K, in the vertical domain. K is then compared by means of comparison means 540 with a first predetermined threshold. If the value of K is less than or equal to the first predetermined threshold, the comparison in the horizontal domain is bypassed and the histogram of the unknown object is normalized at 580 in preparation for passing to step 590 which is described below. If the first threshold is exceeded at 545, process continues on to means for comparing the two-dimensional object with a sample histogram in the horizontal domain at 550. After the comparison at 550, a correlation factor K2 is generated by a second means for generating 560. K2 is compared with a second predetermined threshold at means for comparing 570. If K2 is less than the second predetermined threshold, the process branches at 565 to 510 to select another sample, if K2 is less than or equal to the second threshold, the process branches at 575 to means for normalizing the two-dimensional object histogram and obtaining the normalized chain codes 580.

The unknown object's histogram is normalized by shifting its chain code histogram horizontally and vertically as required to match the scale and rotation of the sample histogram which has satisfied all threshold requirements up to this point in the process. For example, the chain code of the object of FIG. 3B would be 00664422. This object's chain code histogram would correlate well with the chain code histogram of the object of FIG. 3A which has a chain code of 0642. The chain code histograms of the two objects are plotted in FIG. 4A where it is apparent that by shifting object 3C's histogram downwards by multiplying by a scale factor of 0.5, object 3C's chain code histogram will be normalized to the histogram of object 3B. This shifting will result in a normalized chain code histogram of 0246 and a normalized chain code for object 3C of 0642. Since the normalized histogram 0246 can reprsent objects having chain codes of any combination of these numbers, it is necessary to use the Viterbi algorithm to remove this final ambiguity.

Referring again to FIG. 6, after normalization at 580, means for applying a Viterbi algorithm 590 processes the normalized chain code and the chain code of the correlating sample as discussed above. Next a distance function, DF, is determined at means for determining distance function 600. If DF is greater than or equal to a third predetermined threshold which determines the allowable Viterbi correlation at 592, the process is restarted at 510. If DF is less than or equal to the third predetermined threshold, the prccess branches at 610 to 620 where the processor outputs an identification of the two-dimensional object as equal to the object represented by the last sample histogram checked which satisfied all applicable threshold requirements.

It will become apparent to those skilled in the art that various modifications of the present invention can be made without departing from the spirit or scope of the present invention. For example, it is not necessary to follow the exact logical sequence as set out in the flow chart of FIG. 6. Numerous permutations of the sequence shown are possible. Further, the chain code rule as shown by example in this specification is only one example. Other chain code rules, such as those containing 4, 8, 16, 32 or more directional elements may be employed by a system of the present invention. Identification of objects with gross features and boundaries require only a small number of chain code elements, while identification of objects with fine or rounded features would require a higher number of chain code elements.

The embodiments in which an exclusive property or privlege is claimed are defined as follows:

1. A classification processor for classifying an unknown two-dimensional object having a chain code by correlating an unknown object's chain code histogram with stored chain code histograms of known two-dimensional objects comprising:
   means for generating a histogram from the unknown object's chain code reflecting size and orientation of the unknown object;
   means for correlating the generated histogram with a stored chain code histogram of a known object, comprising:
   means for selecting a stored chain code histogram of a known object;
   means for comparing the ukown object's chain code histogram with the selected known object's histogram in a vertical chain code histogram domain;
   first means for generating a first correlation factor in the vertical domain to determine scaled size of the unknown object;
   means for comparing the unknown object's chain code histogram with the selected known object's histogram in a horizontal chain code histogram domain;
   second means for generating a second correlation factor in the horizontal domain to determine rotational orientation of the unknown object;
   means for normalizing the known object's chain code hostogram by shifting the known object's chain code histogram horizontally and vertically as required to match a scaled size and a rotational orientation of the chain code histogram of a known object; and
   means for applying a Viterbi algorithm for resolving a final ambiguity in deciding whether or not the generated histogram and the stored histogram are similar by processing the histograms with a distance function.

2. The device of claim 1 wherein the means for applying the Viterbi algorithm further comprises means for generating a distance function equal to differences in each chain code state between the unknown object's normalized chain code and the chain code of the known two-dimenisonal object wherein the algorithm is stopped before processing of the chain code histograms is completed when a set threshold of the distance function is exceeded thus deeming no match between the unkown object and the known object, or the algorithm continues to completion thereby deeming a match between the unknown object and the known object.

3. The device of claim 2 further comprising means for selecting another stored histogram of another known object upon the deeming no match between the known object and the unknown object, for correlating the unknown object's chain code histogram with another stored chain code histogram of another known object.

4. A method for classifying a two-dimensional object having a chain code by correlating the object's chain code histogram with stored chain code histograms of known two-dimensional objects, with steps comprising:
   generating a chain code histogram from the unknown object's chain code reflecting size and orientation of the unknown object, wherein the chain code assigned to a boundary of the object is assigned according to a chain code rule containing at least eight directional elements;
   correlating the generated chain code histogram with a stored chain code histogram of a known object, comprising:

comparing the unknown object's chain code histogram with a stored histogram of the known object in a vertical chain code histogram domain;

generating a first correlation factor in the vertical domain to determine scaled size of the unknown object;

comparing the unkown object's cahin code histogram with a stored histogram of the known object in a horizontal chain code histogram domain;

generating a second correlation factor in the horizontal domain to determine rotational orientation of the unkown object;

comparing horizontal and vertical correlation factors with predetermined thresholds;

providing results of comparisons of correlation factors, which indicate whether correlating of the unknown object's chain code histogram of the known object should continue; and normalizing the unknown object's chain code histogram and chain code; and applying a Viterbi algorithm for resolving a final ambiguity in deciding whether or not the generated histogram and the stored histogram are similar by processing the histograms with a distance function.

5. The method of claim 4 wherein the step for applying the Viterbi algorithm further comprises generating a distance function equal to a difference between the unknown object's normalized chain code and the chain code of the correlating known two-dimensional object for each chain code state wherein the algorithm is stopped before processing of the chain code histograms is completed when a set threshold of the distance function is exceeded thus deeming no match between the unknown object and the known object and the known object, or the algorithm continues to completion thereby deeming a match between the unknown object and the known object.

6. The method of claim 5 further comprising means for selecting another stored histogram of another known object upon the deeming no match between the known object and the unknown object, for correlating the unknown object's chain code histogram with another stored chain code histogram of another known object.

7. A system for classifying an unknown two-dimensional object, the object having a boundary, comprising:
a sensor for sensing the boundary of the object;
means for assigning a chain code to the boundary of the object according to a chain code rule containing at least eight directional elements;
memory for storing a plurality of chain code histograms of known two-dimensional objects;
means for generating a histogram from the assigned chain code reflecting size and orientation of the unknown object;
means for correlating the generated histogram with a chain code histogram of a known object, comprising:
means for selecting a stored chain code histogram of a known two-dimensional object from the memory;
means for comparing the object's chain code histogram with the selected histogram in a vertical chain code histogram domain;
means for generating a first correlation factor in the vertical domain to determine scaled size of the unknown object;
means for comparing the object's chain code histogram with the selected histogram in a horizontal chain code histogram domain;
a second means for generating a second correlation factor in the horizontal chain code histogram domain to determine rotational orientation of the unknown object;
means for comparing first and second correlation factors with predetermined theresholds; and
means for normalizing the object's chain code histogram and chain code; and
means for applying a Viterbi algorithm for resolving a final ambiguity in deciding whether or not the generated histogram and the stored histogram are similar in that the unknown object matches a known object represented by the stored histogram.

8. The system of claim 7 wherein the means for applying the Viterbi algorithm further includes a means for generating a distance function equal to differences in each chain code state between the object's normalized chain code and the chain code of the correlating known two-dimensional object.

9. A method for classifying an unknown two-dimensional object, the object having a boundary, with steps comprising:
sensing the boundary of the object;
assigning a chain code to the boundary of the object, according to a chain code rule containing at least eight directional elements;
storing a plurality of chain code histograms of known two-dimensional objects;
generating a chain code histogram from the assigned chain code reflecting size and orientation of the unknown object;
correlating the generated histogram with a stored chain code histogram of a known object, comprising:
selecting a histogram from the plurality of chain code histograms of known two-dimensional objects;
comparing the object's chain code histogram with the selected histogram in a vertical chain code histogram domain;
generating a correlation factor in the vertical domain;
comparing the object's chain code histogram with the selected histogram in a horizontal histogram domain;
generating a second correlation factor in the horizontal domain;
comparing correlation factors with predetermined theresholds; and
normalizing the object's chain code histogram and chain code; and
applying a Viterbi algorithm for resolving a final ambiguity in deciding whether or not the generated histogram and the stored histogram are similar in that the unknown object matches a known object represented by the stored histogram.

10. The method of claim 9 wherein the step for applying the Viterbi algorithm further includes generating a distance function equal to the difference between the object's normalized chain code and the chain code of the correlating known two-dimensional object for each chain code state.

* * * * *

UNITED STATES PATENT AND TRADEMARK OFFICE
CERTIFICATE OF CORRECTION

PATENT NO. : 4,783,828

DATED : November 8, 1988

INVENTOR(S) : FIROOZ A. SADJADI

It is certified that error appears in the above-identified patent and that said Letters Patent is hereby corrected as shown below:

Column 6, line 27, delete "hostogram" and in lieu thereof insert --histogram--.

Column 7, line 7, delete "cahin" and in lieu thereof insert --chain--.

Signed and Sealed this

Fourteenth Day of March, 1989

*Attest:*

DONALD J. QUIGG

*Attesting Officer*   *Commissioner of Patents and Trademarks*